United States Patent
Koch et al.

(10) Patent No.: US 7,476,639 B2
(45) Date of Patent: Jan. 13, 2009

(54) METHOD FOR THE PRODUCTION OF CATALYTICALLY ACTIVE LAYER SILICATES

(75) Inventors: Dietrich Koch, Geisenheim (DE); Kisnaduth Kesore, Marl (DE); Anthony Arthur Gustaf Tomlinson, Monterotondo-Staz (IT)

(73) Assignee: Iko Minerals GmbH, Marl (DE)

( * ) Notice: Subject to any disclaimer, the term of this patent is extended or adjusted under 35 U.S.C. 154(b) by 345 days.

(21) Appl. No.: 10/529,581

(22) PCT Filed: Sep. 29, 2003

(86) PCT No.: PCT/EP03/10788

§ 371 (c)(1),
(2), (4) Date: Aug. 12, 2005

(87) PCT Pub. No.: WO2004/030817

PCT Pub. Date: Apr. 15, 2004

(65) Prior Publication Data

US 2006/0094594 A1    May 4, 2006

(30) Foreign Application Priority Data

Sep. 30, 2002  (DE) ............................. 102 45 963

(51) Int. Cl.
*B01J 21/00*    (2006.01)

(52) U.S. Cl. ................ 502/240; 502/242; 502/244; 502/245; 502/263; 977/712

(58) Field of Classification Search .............. 502/68, 502/80, 81, 84, 148, 232, 240, 242, 244, 502/245, 263; 208/112, 27, 138; 252/378 R; 977/712

See application file for complete search history.

(56) References Cited

U.S. PATENT DOCUMENTS 4,990,476 A * 2/1991 Ward ........................... 502/68
6,521,559 B1   2/2003 Long et al.

FOREIGN PATENT DOCUMENTS

JP    08 117597    5/1996

OTHER PUBLICATIONS

Heylen et al. "Preadsorption of organic compounds on iron oxide-pillared clays", Microporous Materials 5 (1995) 53-60.*
Fudala et al. "Thermogravimetric Investigation Solid-state ion-exchange procedure of $Cu^{2+}$, $Co^{2+}$, $Ni^{2+}$, and $Fe^{2+}$ ions into montmorillonite", Journal of Thermal Analysis, vol. 47 (1996) 399-406.*

(Continued)

*Primary Examiner*—Steven Bos
*Assistant Examiner*—Anthony J Zimmer
(74) *Attorney, Agent, or Firm*—Oblon, Spivak, McClelland, Maier & Neustadt, P.C.

(57) ABSTRACT

The invention relates to a method for the production of catalytically active layer silicates with one or more intermediate layers, especially Al and/or Ti-pillared clays, wherein a metal solution is added to the layer silicate and the mixture is dried, thereby producing metal atom columns supporting the corresponding intermediate layer. A metal salt is admixed dry to the resulting dry substance. The ensuing dry mixture is finally heated so that the metal atoms or the transition metal atoms become deposited in the intermediate layer.

21 Claims, 1 Drawing Sheet

OTHER PUBLICATIONS

Long et al. "Acid- and base-treated Fe3+-TiO2-pillared clays for selective catalytic reduction of NO by NH3", Catalysis Letters 59 (1999) 39-44.*

Li, W. et al.: "Selective catalytic reducttion of nictric oxide by ethylene in the presence of oxygen over Cu2+ ion-exchanged pillared clays" Applied Catalysis B: Environmental, vol. 11, pp. 347-363, 1997. XP002277190.

Yang, R. T.; Li, W: "Ion-Enxchanged Pillared Clays: A New Class of Catalysts for Selective Catalytic Reduction of NO by Hydrocarbons and by Ammonia" Journal of Catalysis, vol. 155, pp. 414-417, 1995. XP002277191.

Sadykov, Vladislav A. et al.: "Nanocomposites based upon alumina and zirconia pillared clays loaded with transition metal cations and clusters of precious metals: synthesis, properties and catalysis of NOx slelective reduction by hyrdocarbons" The 1999 MRS Fall Meeting—Symposium F'Nanophase and Nanocomposite Materials III, vol. 581, pp. 435-440, Nov. 29, 1999. XP008029911.

Crocker M. et al.: "Preparationof acidic forms of montmorillonite clay via solid-state ion-exchange reactions" Catalysis Letters, vol. 15, pp. 339-345, 1992. XP002277192.

* cited by examiner

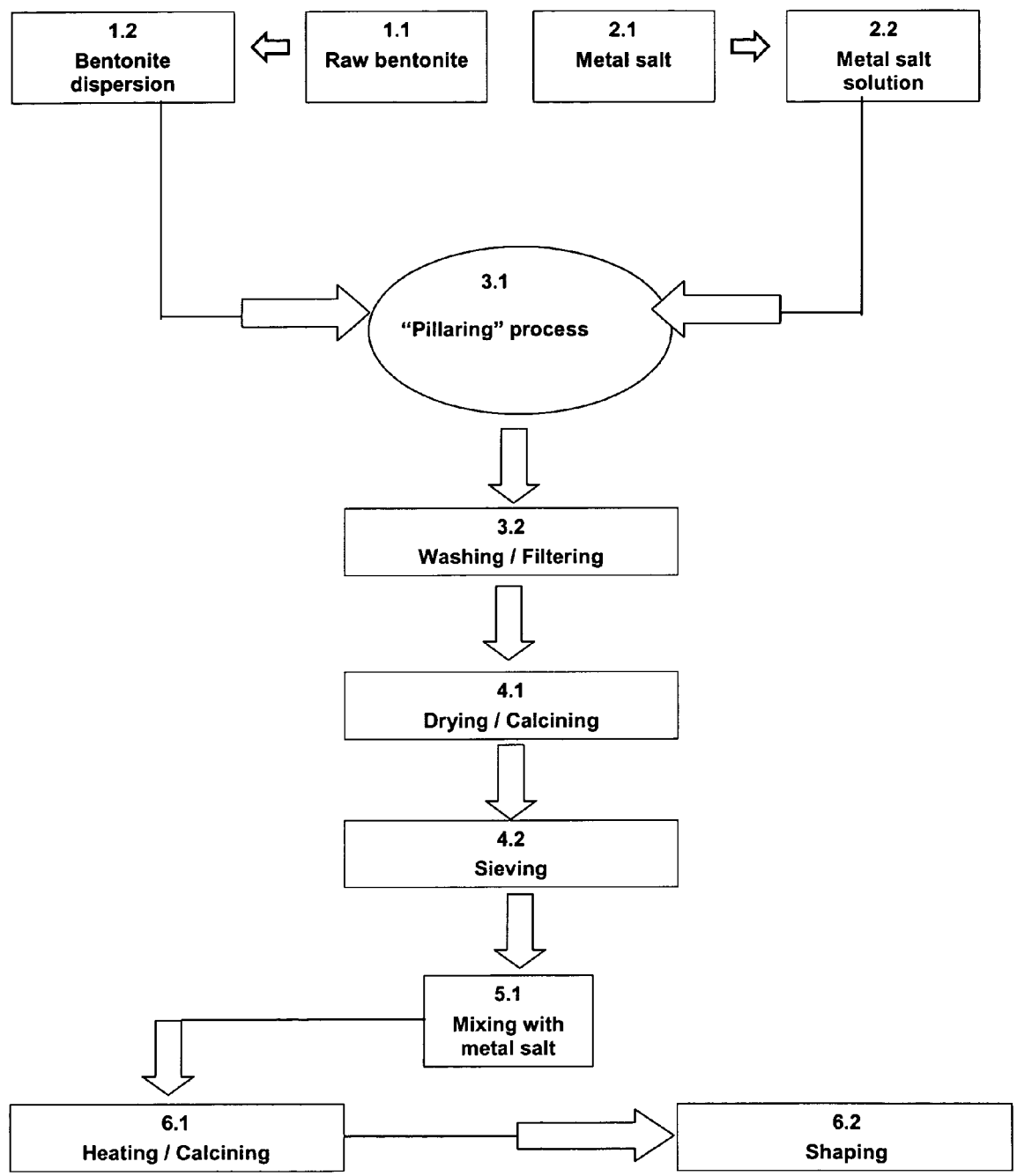

METHOD FOR THE PRODUCTION OF CATALYTICALLY ACTIVE LAYER SILICATES

CROSS REFERENCE TO RELATED APPLICATION

This application is a 371 of PCT/EP03/10788, filed Sep. 29, 2003, and claims priority to German Application No. 102 45 963.0, filed on Sep. 30, 2002.

The invention relates to a method for producing catalytically active layered silicates with one or more intercalated layers, especially Al-pillared and/or Ti-pillared clays Catalysts, especially denox catalysts, or in other words catalysts for removal of nitrogen oxides ($NO_x$) in exhaust gases, are used on a large scale for exhaust-gas treatment in motor vehicles. In the case of catalytic post-combustion, the catalysts are composed of a support material with active coating and vibration-proof, thermally insulated bedding in a housing. Granules and monoliths of sintered $Al_2O_3$ are used as support materials. The active catalyst layer is composed of small quantities of noble metals (Pt, Rh, Pd) and is known to be sensitive to lead.

Such motor-vehicle or even three-way or selective catalysts have proved themselves and are used to reduce NO to $NH_3$ in a first step. After addition of secondary air, almost complete oxidation of CO and HC can then take place in a second step. In the process, $NH_3$ is burned again to NO.

Such catalysts have been used for many years, but are not capable of being absolutely convincing from environmental and medical viewpoints. This has been shown only on the basis of recent vehicle studies on gasoline and diesel engines and is also reflected by traffic emission studies as well as current legislation. After all, the active catalyst layer of, for example, platinum (Pt) in such catalysts becomes detached in the course of time and is discharged into the surrounding air. Consequently, platinum accumulations have been observed in the human body, but the potential adverse effects are still unclear. In any case, a need exists to provide virtually emission-free catalysts.

Furthermore, it was reported only recently that toxic components are formed by reaction of carbon monoxide in platinum-base catalysts. These components may lead to cell mutations (see "Chemical and Engineering News", July 2002, page 8).

Certainly alternative catalyst concepts, such as those based on zeolites, have been discussed in the prior art. These zeolites were treated with transition metals. Here also, however, the formation of unhealthful secondary products, for example in the form of HCNO, has been observed. Moreover, the described catalysts do not have the requisite resistance to water, sulfur oxides and heavy metals.

In the prior art from which the present invention is derived, there is described the production of catalytically active layered silicates, also known as pillared clays, and of zeolite-type catalysts, wherein the charge-compensating cations in the intercalated layers of the respective layered silicates are replaced by larger inorganic hydroxymetal cations. This is achieved in a usually aqueous solution. Then the resulting substance is dried and calcined (see the paper of R. Q. Long and R. T. Yang, "The promoting role of rare earth oxides on Fe-exchanged $TiO_2$-pillared clay for selective catalytic reduction on nitric oxide by ammonia"; Applied Catalysis B: Environmental 27 (2000) 87-95). This is complex by virtue of the process sequence. In this context the invention is intended to be helpful on the whole.

The technical problem underlying the invention is to provide a method for producing catalytically active layered silicates by means of which a largely emission-free catalyst base material can be produced in simple manner.

To solve this problem, the subject matter of the invention is a method for producing catalytically active layered silicates, especially nanoscale composite layered silicates, with one or more intercalated layers, especially Al-pillared and/or Ti-pillared clays, wherein a metal solution, preferably polycationic metal solution, is added to the layered silicate and then the mixture is dried to generate the metal atom pillars that support the respective intercalated layer, wherein a metal salt, especially transition metal salt, is further added to the dry substance obtained in such a way to generate a dry mixture, and wherein the dry mixture is finally heated, so that the metal atoms or transition metal atoms become included in the intercalated layer with evolution of gas. Consequently cation exchange due to dry mixing and heating takes place in the intercalated layers.

The catalytically active layers silicates are usually nanoscale composite layered silicates, or in other words layered silicates in which the described solid-state ion exchange or inclusion of the metal atoms or transition metal atoms takes place in the nanometer range. The same is true for the formation of the metal atom pillars supporting the respective intercalated layer. In this category there fall mainly metal oxides or metal polyoxides, which in principle mean metal compounds (containing oxygen) that ensure the supporting effect by the formation of pillars in the respective intercalated layer.

In order now to produce this intercalated layer, the metal solution or polycationic metal solution or metal ion complex solution in question is added to the layered silicate and then the mixture is dried, calcined and if necessary converted to ammonium form to generate the pillars supporting the respective intercalated layer. This is usually carried out in alkaline solution, in which case sodium hydroxide solution is mostly used to prepare the metal solution.

In the described wet-chemical modification of the layered silicate, the sodium hydroxide or aluminium hydroxide previously present in solution precipitates out, and the metal ions or metal complex ions are deposited in the intercalated layers or become attached to the surfaces of the layered silicates. In the intercalated layer they form pillars in the nanometer range after drying. Hereby the intercalated layers or interstices between the silicate layers not only are expanded but also are established in definite manner as regards the layer spacing.

It has proved advantageous to use an aluminum and/or titanium and/or iron solution as the metal solution. Furthermore, copper and/or chromium solutions or a polyoxide mixture of these metals can be used. In principle, any kinds of transition metals in pure form or as mixtures are suitable for this purpose. Preferably the use of titanium chloride in combination with sodium hydroxide is possible. Similarly, this is true for the combination of iron chloride with sodium hydroxide. As an example, aluminum hydroxide ($Al(OH)_3$) is formed by mixing appropriate solutions of aluminum salts (aluminum chloride in the present case) with caustic soda solution or sodium hydroxide (NaOH) in water. On the whole, the otherwise poorly soluble aluminum hydroxide is precipitated out of the solution.

In any case, the described wet-chemical modification of the layered silicate causes the metal atoms previously present in solution (such as Al, Fe, Ti atoms, etc.) to become deposited in the intercalated layer or layers of the layered silicates, where after drying they form the metal atom pillars that support the intercalated layer. In this way the interstices between the silicate layers not only are expanded but also are established in definite manner as regards the layer spacing.

In this connection it can be additionally emphasized that separately prepared mixtures can also be used as the catalytically active layered silicate. Thus post-treated mixtures of Al-pillared clays and Ti-pillared clays are conceivable. Thus the dry substance or mixture prepared in this way takes into account the different catalytic effect of, for example, titanium metal atom pillars occupied with copper on the one hand and aluminum metal atom pillars occupied with copper on the other hand. In the first case, that of the titanium metal atom pillar occupied with copper, a particularly pronounced catalytic effect is obtained in the low-temperature range, whereas the aluminum metal atom pillars occupied with copper are particularly active at high temperatures. Consequently, the catalytic effect can be optimally adjusted over a wide temperature range by mixing the respective layered silicates subjected to different pillaring processes with the dry substance. Thereafter the dry substance produced from the two layered silicates that have first been differently pretreated is subjected as described to a solid/solid reaction in association with the metal salt or transition metal salt. If a copper salt is used for this purpose, the copper atoms form a coating on or are included in the intercalated layer in the manner described.

These metal atoms or transition metal atoms, which are usually copper atoms, are considered—in association with the previously produced metal atom pillars—to be primarily responsible for the catalytic effect. Achieving low costs for a catalytically active layered silicate produced in this way is not the only benefit of resorting to a transition metal salt or to transition metal atoms. Instead, particularly in the case of copper, the danger does not exist (or no longer exists) that it will volatilize and be discharged to the environment at the high temperatures prevailing in a catalyst. This represents a clear difference compared with the noble metals used heretofore, such as platinum.

It is self-evident that various process steps can be introduced before the drying operation in question. For example, the invention recommends that, after addition of the metal solution, the mixture of layered silicate and first polyhydroxide cation complex solution first be washed, then filtered and only thereafter heated slowly, for example to 100° C., whereupon the reaction of formation of the hydrated nanoscale pillars or metal atom pillars takes place spontaneously at room temperature.

In contrast, the subsequent drying operation is performed by a rapid or shock-like temperature rise, beginning at about 100° C. (for example, 100° C. or higher in about 10 minutes) to about 500° C. (or even higher), so that the described metal atom pillars are fixed in the respective intercalated layer. In actual fact, more or less pronounced migration of the metal atom pillars into the intercalated layers even takes place at this stage, and, after the end of the drying operation, a homogeneous distribution of the dehydrated metal atom pillars, which have therefore been freed of any water and (sodium) hydroxide, exists in the intercalated layers. Thus a direct relationship exists between the thermal dehydration and the ensuing recombination of the metal atom pillars. This recombination is largely irreversible.

After all, it has been shown that layered silicate modified in such a way is sufficiently thermally stable up to several hundred degrees that it can be used as catalyst.

Beforehand, however, the catalytically active cations in the form of mostly transition metal ions such as titanium, iron, cobalt, nickel, copper, zinc, etc. must be included in the intercalated layer prepared by means of the metal atom pillars. In principle, it is naturally also conceivable to use cations of non-transition metal atoms at this stage, or in other words cations from the main groups, such as sodium, potassium, rubidium, etc. Lanthanum is also conceivable. Even noble metal ions such as gold or silver can be added, usually in trace concentrations in the form of salts, to the transition metal salts. These (noble) metal ions may contribute to doping, so to speak, of the transition metal ions, which are usually included.

In particular, the inclusion of copper cations in the respective intercalated layers has proved effective at this stage. After all, these cations are capable of decomposing nitrogen oxides ($NO_x$) substantially to nitrogen ($N_2$) and oxygen ($O_2$) at elevated temperature. In this connection, it is naturally possible in principle to supply a reducing agent such as methane additionally during operation. In any case, the main objective is selective catalytic chemical reduction of the $NO_x$ gases by means of different reducing agents, such as HC and/or CO and/or $NH_3$.

Specifically, the metal in the form of metal salt is dry-mixed with the previously prepared dry substance comprising layered silicates containing included metal atom pillars. In particular, copper nitrate ($Cu(NO_3)_2$) or even copper acetate as well as copper(II) sulfate ($CuSO_4$) have proved favorable as metal salts for this purpose. The said dry mixture is ground if necessary and then heated (dry), specifically at temperatures of mostly higher than 300° C., usually between 450° C. and 700° C. Thereby the metal salt or copper salt decomposes with liberation of nitrogen oxides (nitrogen dioxide ($NO_2$)) or sulfur dioxide ($SO_2$) in the case of the example. Depending on the metal atom pillars formed in the respective case, solid-state exchange can take place and/or the intercalated layers and/or inner/external surfaces can become occupied by the desired metal atoms or metal atom clusters.

On balance, therefore, what remains are metal or copper atoms or ions and/or metal atom clusters or copper atom clusters that are included predominantly in the intercalated layer. The remaining metal atoms or metal ions or metal atom clusters occupy the external surfaces. Consequently, thermal exchange of the charge-compensating cations takes place at least partly in the intercalated layers of the layered silicates by the aforesaid metal atoms or metal ions, which contribute substantially to the catalytic effect of the layered silicate produced in this way. In the process, the metal atoms become distributed predominantly uniformly in the intercalated layers.

In contrast to the already known procedures, production is achieved particularly simply, because the use of a metal solution or transition metal solution to be mixed with the previously modified dry substance is avoided. Any filtering and treatment steps that may be needed for this solution are therefore eliminated according to the invention, because simply a dry mixture is prepared. In addition, the obligatory heating of this dry mixture simultaneously serves the purpose of calcining, meaning that a further separate process step provided in the prior art is eliminated. As is usual, calcining ensures that any water of crystallization or other solvents that may be present in the dry mixture is removed and simultaneously carbon dioxide is decomposed.

The resulting substance or the end product can be slightly moistened in order to impart any desired shape, if necessary while adding a binder and optionally also a plasticizer. Such a binder may even be water, aluminum oxide or a ceramic material. The end product can be shaped and machined without problems, for example by means of an extrusion operation. In this way it is possible to produce simple monolithic structures or pellets, or in other words small shaped bodies, which are directly suitable for use as automobile exhaust-gas catalysts. Beforehand, however, extruded products or pellets produced in this way must be heated and dried.

The monolithic structures and the pellets offer the advantage that they are catalytically active throughout their entire volume. This is therefore the difference when the catalytically active layered silicate produced according to the described method is used as a coating in combination with a (an inert) support material such as Coatin. Such a coating can be prepared, for example, by applying a solution of the inventive layered silicate dropwise onto the support material. Since the metal atoms are distributed in a wide-meshed pattern in the intercalated layers, the danger does not exist that the use of such a coated support material as catalyst will lead during operation to undesired sintering processes that lower the catalytic activity. Naturally this advantage is even more pronounced when there are used either monolithic catalysts composed of the inventive layered silicate or pellets, or in other words a more or less large-sized granular product.

In principle, two-layer minerals such as kaolinite or aluminosilicates can be used as the layered silicate. Preferably, however, the invention is employed for three-layer minerals or even four-layer minerals. Montmorillonite or bentonite have proved suitable as three-layer minerals. Further advantageous measures are described in claim 15.

EXAMPLE

As the starting material there is used bentonite, especially calcium bentonite in which the main constituent is montmorillonite, which is composed of approximately 57 wt % of $SiO_2$, approximately 23 wt % of $Al_2O_3$, approximately 3 wt % of $Fe_2O_3$ and approximately 10 wt % of $H_2O$. This starting material is fine-ground in order to increase the specific internal crystalline surface. By virtue of fine grinding the effectiveness of the catalyst base material prepared therefrom can be increased.

This step is followed by what is known as "pillaring", or in other words the wet-chemical inclusion of pillar (metal) atoms in the two intercalated layers of the three-layer mineral used. Beforehand, the finely ground mineral powder is dispersed in water, although this is not absolutely necessary, because an aluminum hydroxide solution (AlOH) is added to the powder or to the dispersion in any case. By means of the aluminum hydroxide solution in the dispersion, the ratio of the mass of bentonite relative to the volume of the overall suspension can be determined and adjusted. This ratio represents a measure of the concentration of the pillaring system, or in other words a measure of how many pillar atoms are ultimately needed in the intercalated layers.

In this connection, particular importance attaches to the aluminum content relative to bentonite. After all, if too much aluminum relative to the bentonite content is present in the solution, it leads to the situation in which the specific internal surface decreases as a result of increased formation of aluminum pillars. Likewise, if the aluminum content relative to the bentonite concentration in the solution is too low after dispersion, it leads to the result that the intercalated layer does not have the necessary stability, an effect that can become noticeable in particular when the temperature is raised.

Thus an optimal range, defined substantially on the basis of the specific internal surface achieved, exists for the ratio of aluminum to bentonite. Obviously the OH/Al ratio must be kept constant for these experiments. In any case, the end products can be assessed on the basis of the specific internal surface and of the achieved pore volume, which reaches a maximum at an optimal ratio of aluminum to bentonite. This is evident in the following table, where an aluminum/bentonite ratio of approximately 3.0 to approximately 5.0 leads to maximum values with regard to specific internal surface and pore volume.

Results of Individual Parameters for Various Al/Bentonite Ratios, Measured in mmol (6.8 g Bentonite/liter)

| mmol Al/g | Conductivity [mS/cm] | 24-h sediment volume [ml] | Surface [m$^2$/g] | Pore volume [μl/g] | Micropore volume [μl/g] | d value [Å] |
|---|---|---|---|---|---|---|
| 1.0 | 2.3 | 19 | 109 | 97 | 60 | 16.9 |
| 2.0 | 4.3 | 22 | 136 | 88 | 75 | 17.0 |
| 3.0 | 6.2 | 20 | 309 | 279 | 143 | 18.6 |
| 5.0 | 9.7 | 19 | 290 | 258 | 131 | 17.5 |
| 6.8 | 10.5 | 18 | 246 | 99 | 135 | 19.1 |
| 8.0 | 15.1 | 17 | 128 | 106 | 116 | 18.5 |
| 10.0 | 15.2 | 16 | 125 | 95 | 66 | 17.5 |

On the basis of this Table 1, it is obvious that, at the already mentioned Al/bentonite ratio of approximately 3.0 to 5.0, not only does the specific internal surface and also the pore volume reach a relative maximum, but so also does the micropore volume. Simultaneously, the thickness of the intercalated layer (d value) assumes certain predetermined values between 17 Å and 19 Å, at which final inclusion of copper atoms is favored.

It has also now been further shown that a particularly favorable density spectrum of the formed metal atom pillars also exists at the Al-bentonite ratio of approximately 3.0 to 5.0 already indicated in the foregoing. What this means is that, taking into consideration more or less fixed values for the intercalated layer (d value), the number of metal atom pillars per unit area varies and obeys almost a gaussian distribution. This spectrum of the density distribution of the metal atom pillars favors the catalytic effect. After all, the decomposition of the nitrogen oxides usually takes place in several stages and not in one stage. In this connection, the most important feature of the small pores, or in other words zones with a large density of metal atom pillars per unit area, is that NO is first converted to $NO_2$. In the larger pores, or in other words those with smaller density of metal atom pillars per unit area, the conversion of $NO_2$ now takes place substantially to nitrogen ($N_2$) and oxygen ($O_2$)—Consequently, the density distribution of metal atom pillars established at the cited Al-bentonite ratio of approximately 3.0 to 5.0 supports the multi-stage decomposition of the nitrogen oxides.

Before the copper atoms are included, however, the bentonite modified with aluminum pillars in the intercalated layer is dried, specifically in the already described manner. Copper nitrate or copper sulfate as the metal salt is dry-mixed with this dry substance. This dry mixture is finally heated at 450° C. to 550° C., so that nitrogen dioxide and sulfur dioxide escape and the remaining copper atoms or copper ions become included in the previously formed intercalated layer containing the aluminum atom pillars.

As a result, there is described the modification of layered silicates that are known in themselves, which silicates act catalytically on an exhaust-gas stream and for this purpose rely on metal atoms, of copper, for example, included in the intercalated layer. These copper atoms in the electric field of the intercalated layer are capable of decomposing nitrogen oxides in particular. All of this is achieved by relatively simple wet-chemical and dry-chemical treatment methods and grinding operations. In the process, the layered silicate used is endowed with a large specific surface.

Since the included cations having catalytic activity in the electric field formed by the surrounding intercalated layer are securely integrated into the crystal microstructure, negative effects of the type that are unavoidable in the prior art can be ruled out for practical purposes. This means that the catalytically active layered silicates produced in the scope of the invention do not tend to any emissions that are hazardous to the environment or to health—even at elevated temperatures such as are generally observed in motor-vehicle exhaust-gas catalysts.

In this connection, the resulting substance can be simply shaped, for example by means of an extrusion operation, directly or if necessary with addition of a binder. Thus complex shaping operations are obviated. Consequently, a practically emission-free catalyst base material is provided, which in addition can be processed inexpensively to almost any desired shape.

Finally, it has also been found in this connection that the modified layered silicate produced within the scope of the inventive method not only can be used as catalyst base material but in addition is also suitable for filtering soot in diesel motor vehicles. In this case the intercalated layers absorb the individual soot particles, while the nitrogen oxides ($NO_x$) present in the exhaust gas ensure that the soot filter formed in such a way does not become clogged. After all, at the temperatures that are developed, the nitrogen oxides oxidize the carbon of the soot particles to carbon dioxide ($CO_2$), which exits the soot filter in question in the form of gas. Thus not only does decomposition of the nitrogen oxides take place, but at the same time soot particles are filtered and chemically reacted.

The individual process steps are illustrated once again in the attached flow diagram according to FIG. 1.

First the layer material or the starting material (raw bentonite) is sieved if necessary and dried in step 1.1. A grinding operation is also conceivable during process step 1.1.

Thereafter this starting material is dispersed in water, for example, as is indicated in step 1.2. In the case of this example, therefore, a bentonite dispersion is obtained.

In parallel, the metal solution is prepared in step 2.1, by dissolving a metal salt (aluminum salt) in the presence of added sodium hydroxide solution, and the desired metal solution (aluminum hydroxide solution) is formed according to 2.2.

Thereafter the starting dispersion or bentonite dispersion 1.2 and the metal salt solution or aluminum hydroxide solution 2.2 are mixed with one another for the "pillaring" process. This can be accomplished with or without ultrasonic assistance to improve mixing, specifically during process step 3.1. The solution or mixture produced in this way is then washed and filtered in step 3.2, after which it is dried and calcined in step 4.1. This is usually done at temperatures between 400° C. and 600° C. within a time period of one to twelve hours.

This is followed by a sieving operation, which in step 4.2 yields a dry substance containing particle sizes smaller than 500 μm. This dry mixture is now intensively dry-mixed in step 5.1 with the metal salt, such as copper salt, or also with other metal salts.

Thereafter the catalytically active metal atoms or transition metal ions are included in the intercalated layer during step 6.1, in which this dry mixture is heated and calcined, specifically for a duration of one to twelve hours. Finally, the process is completed with a shaping operation in step 6.2, with or without additional use of binder materials or plasticizers. At the end, the finished product is then available as a monolithic unit, as pellets or as solution for coating a support material. In each case, the end product is particularly steam-resistant, which predestines it for use for catalytic exhaust-gas purification in the exhaust-gas system of a motor vehicle.

The invention claimed is:

1. A method for producing a catalytically active layered silicate, with one or more intercalated layers, comprising:
   (1) adding a metal solution to a layered silicate to form a mixture;
   (2) drying the mixture to generate metal atom pillars that support the respective intercalated layers, to obtain a dry substance;
   (3) dry-mixing a transition metal salt where the transition metal is selected from the group consisting of copper, titanium, indium, cerium, and lanthanum with the dry substance obtained in (2) to generate a dry mixture; and
   (4) shock-heating the dry mixture obtained in (3) at a heating rate of about 100° C./10 min or greater to disperse the transition metal atoms into the intercalated layer to achieve a homogeneous distribution of dehydrated metal atom pillars in the intercalated layers and to simultaneously calcinate the dry mixture.

2. The method according to claim 1, wherein the metal solution is an Al, Ti, Fe, Cu or Cr solution.

3. The method according to claim 1, wherein the dry mixture of(3) is heated to a temperature of higher than 300° C.

4. The method according to claim 1, further comprising:
   washing the mixture of layered silicate and metal solution of (1),
   filtering said mixture, and
   heating said mixture, whereupon the formation of the metal atom pillars spontaneously occurs at room temperature.

5. The method according to claim 1, further comprising:
   processing the layered silicate by an acid treatment to a cationic condition or by an alkaline treatment to an anionic condition,
   washing the layered silicate, and
   drying the layered silicate after formation of the metal atom pillars in the intercalated layers.

6. The method according to claim 1, wherein the transition metal salt is copper nitrate or copper sulfate.

7. The method according to claim 1, further comprising shaping a substance resulting from said shock heating to form a shaped product.

8. The method according to claim 7, further comprising drying the shaped product.

9. The method according to claim 1, wherein the layered silicate is a two-layer mineral, a three-layer mineral, or a four-layer mineral.

10. The method according to claim 1, wherein the layered silicate has an internal surface value of at least 300 m$^2$/g.

11. The method according to claim 1, wherein the catalytically active layered silicates are nanoscale composite layered silicates.

12. The method according to claim 1, wherein the metal solution is a polycationic metal solution.

13. The method according to claim 1, wherein the dry mixture of (3) is heated to a temperature ranging from 450° C. to 700° C.

14. The method according to claim 1, wherein a temperature for the shock heating of (4) is adjusted from 100° C. to 500° C. in 30 minutes.

15. The method according to claim 7, further comprising shaping the substance resulting from the dry mixture during an extrusion operation.

16. The method according to claim 7, further comprising adding a binder.

17. The method according to claim 1, wherein the metal solution is a mixture of Al, Ti, Fe, Cu, or Cr polyoxide solutions.

18. The method according to claim 9, wherein the two-layer mineral is kaolinite or an aluminosilicate.

19. The method according to claim 9, wherein the three-layer mineral is montmorillonite or bentonite.

20. The method according to claim 11, wherein the catalytically active layered silicate is a Al-pillared clay, a Ti-pillared clay, or a combination thereof.

21. The method according to claim 16, wherein the binder is aluminum oxide.

\* \* \* \* \*